US006427968B1

(12) United States Patent
Stoecklein

(10) Patent No.: US 6,427,968 B1
(45) Date of Patent: Aug. 6, 2002

(54) VALVE FOR CONTROLLING FLUIDS

(75) Inventor: Wolfgang Stoecklein, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/831,219

(22) PCT Filed: Sep. 9, 2000

(86) PCT No.: PCT/DE00/03136

§ 371 (c)(1),
(2), (4) Date: May 8, 2001

(87) PCT Pub. No.: WO01/23741

PCT Pub. Date: Apr. 5, 2001

(30) Foreign Application Priority Data

Sep. 30, 1999 (DE) ........................................ 199 46 828

(51) Int. Cl.[7] ................................................ F16K 31/12

(52) U.S. Cl. .................................... 251/57; 251/129.06

(58) Field of Search ............................ 251/57, 129.06, 251/335.2, 335.3, 129.14; 137/627.5, 901; 239/102.1, 102.2, 585.1

(56) References Cited

U.S. PATENT DOCUMENTS 4,560,871 A * 12/1985 Bowman et al. .............. 251/57
6,076,800 A * 6/2000 Heinz et al. .................. 251/57
6,142,443 A * 11/2000 Potschin et al. ....... 251/129.06

FOREIGN PATENT DOCUMENTS

DE 196 24 001 A 12/1997
DE 197 08 304 A 9/1998
DE 198 03 910 A 11/1998
DE 197 32 802 A 2/1999
DE 197 42 943 C 4/1999
EP 0 816 670 A 1/1998

* cited by examiner

*Primary Examiner*—Lesley D. Morris
*Assistant Examiner*—John Bastianelli
(74) *Attorney, Agent, or Firm*—Michael J. Striker

(57) ABSTRACT

A valve (1) for controlling liquids is embodied with a piezoelectric unit (3) for actuating a valve member (2) that is axially displaceable in a bore (8) of a valve body (9). One end of the bore (8) adjoins a valve system pressure chamber (18) defined by a sealing element (25), and its other end adjoins a valve low-pressure chamber (16), which has a leak drainage conduit (17) and which communicates with the valve system pressure chamber (18) via a compensation conduit (19), which has a pressure limiting device (20, 23') and a filling device (23, 23'). The valve member (2) is assigned a valve closing member (13), which cooperates in such a way with at least two valve seats (14, 15), disposed in the valve low-pressure chamber (16), for opening and closing the valve (1) that in a closing position it separates the valve low-pressure chamber (16) from a valve control chamber (12), which is at high pressure, and in an intermediate position between the valve seats (14, 15) it fluidically connects the valve low-pressure chamber (16) to the valve control chamber (12); at least one damping device (20, 23', 24) for damping the control motions of the valve member (2) is provided and briefly generates hydraulic counterforces (Fig.).

11 Claims, 2 Drawing Sheets

VALVE FOR CONTROLLING FLUIDS

PRIOR ART

Figure 1:
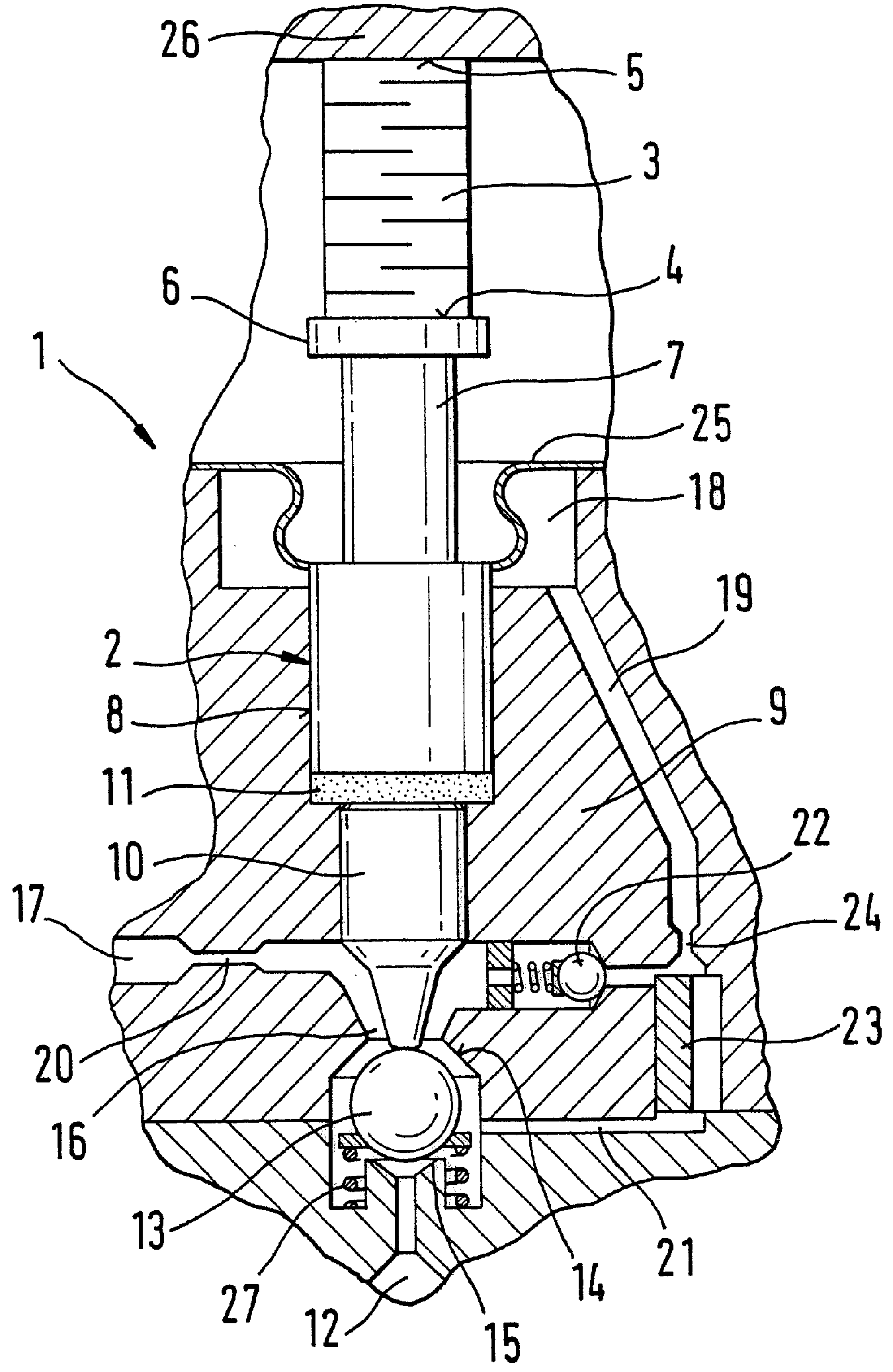

The invention is based on a valve for controlling liquids as defined in more detail by the preamble to claim 1.

From German Patent Disclosure DE 197 328 02, a fuel injection device for internal combustion chambers is known that has a high-pressure fuel source. The fuel injection device has two valve seats, which cooperate with sealing faces of a closing body in a motion sequence upon actuation by a piezoelectric drive; initially, in the closing position, the closing body is located on the first valve seat and is then moved into an intermediate position between the valve seats, and then regains a closing position, but on the second valve seat.

In this way, because of the course of motion of the closing body from one valve seat to the other, a brief relief of a valve control chamber is attained, by way of whose pressure level an opening and closing position of a valve needle in the fuel injection device, which is embodied as force-balanced, is determined, and the fuel injection is thus controlled. The fuel injection is made possible while the closing body is located in an intermediate position between the two valve seats. In this way, the fuel injection is achieved by means of a single excitation of the piezoelectric drive.

Since a time-consuming reversal of motion of the closing body during the fuel injection is not needed, the time losses upon triggering the known fuel injection device are advantageously relatively slight.

However, it has been found that overswings of the closing body occur when the closing body is to be brought to a middle position between the two valve seats. As soon as the closing body swings too far in the direction of the first or the second valve seat, this can adversely cause imprecisions in metering the injection quantity.

It is possible for the middle position of the closing body between the valve seats to be stabilized by spring force, but that has the disadvantage that the piezoelectric drive would have to be moved counter to the spring force into its closing position on the second valve seat. Accordingly, the piezoelectric drive would have to be made correspondingly large, thus adversely affecting production costs and the structural dimensions of the injection device.

The object of the invention is to create a valve for controlling liquids with which the aforementioned disadvantages, and especially overswings in the middle position of the valve closing member, are avoided.

ADVANTAGES OF THE INVENTION

The valve of the invention for controlling liquids, having the characteristics of claim 1, has the advantage that the control motions of the valve member are damped by damping devices in such a way that the valve closing member is stabilized in its middle position between the two valve seats. Accordingly, even high-frequency injections of liquids, especially fuel, through the valve of the invention can be performed exactly, without leading to fluctuations in the injection quantity from overswings of the valve closing member into an unfavorable intermediate position.

In the valve of the invention, the damping devices generate hydraulic forces that briefly act counter to the direction of motion of the valve closing member and thus suitably slow it down into a middle position between the two valve seats. Accordingly, the valve closing member can reach its stable middle position without the incidence of overswings.

A significant advantage of the invention is also that the hydraulic counterforces generated by the damping devices act only briefly, and so the piezoelectric unit does not move the valve closing member into the closing position toward the second valve seat counter to these damping forces. The piezoelectric unit can thus be correspondingly small in size, which reduces the production costs.

Further advantages and advantageous features of the subject of the invention can be learned from the specification, drawing and claims.

DRAWING

Figure 2:
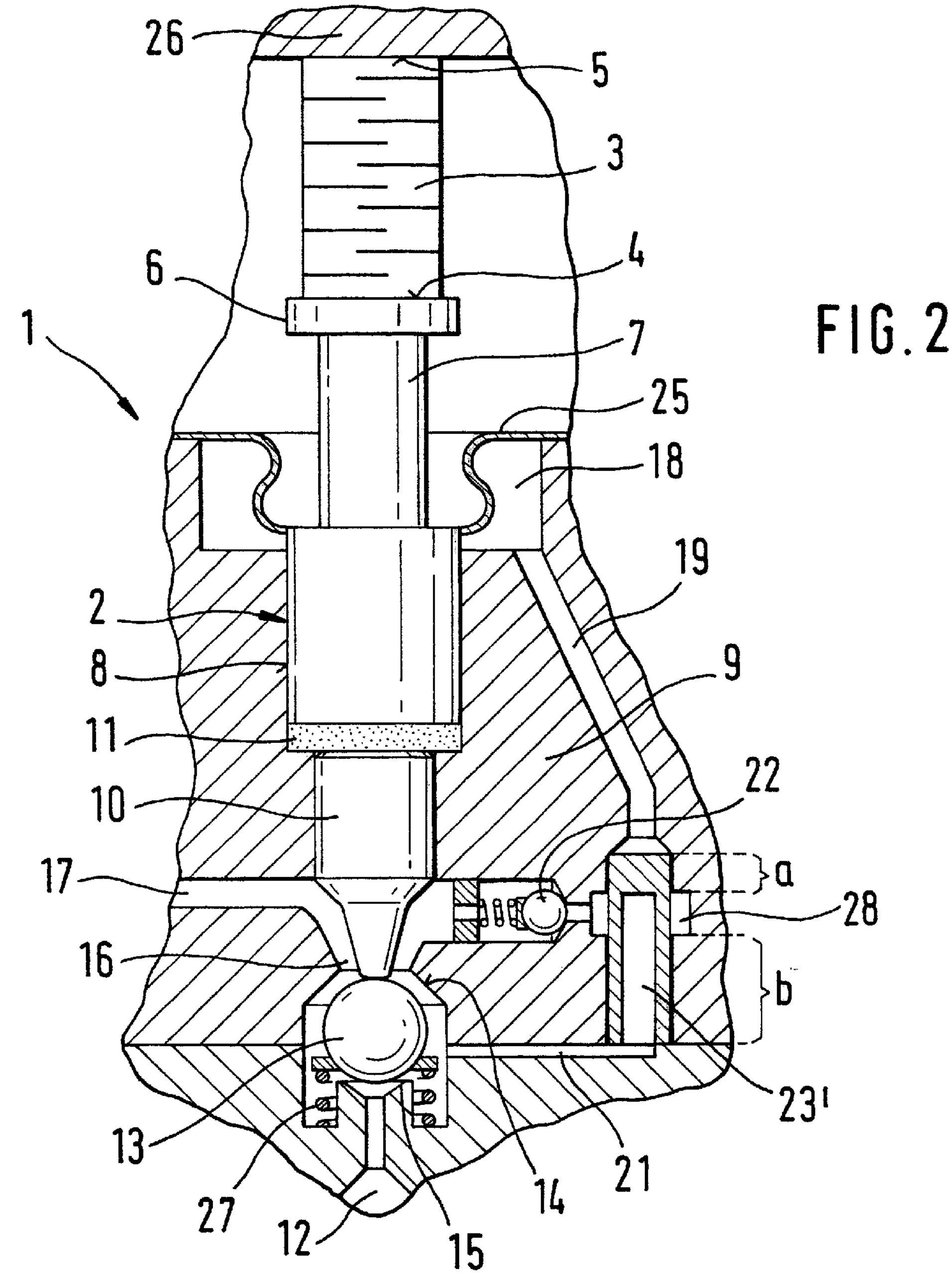
Figure 3:
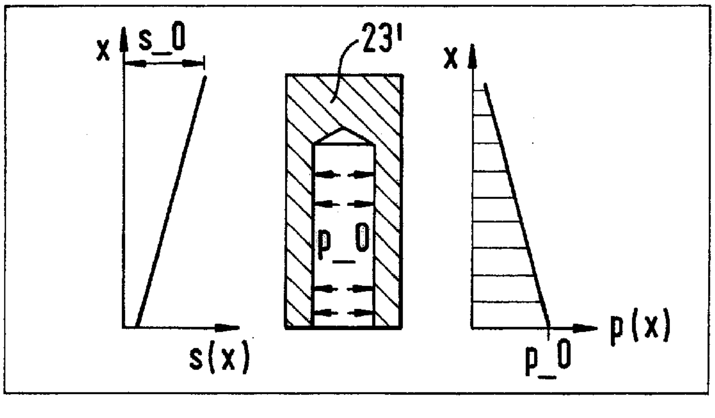

Two exemplary embodiments of the valve of the invention for controlling liquids are shown in the drawing and described in further detail in the ensuing description. Shown are FIG. 1, a schematic, fragmentary view of a first exemplary embodiment of the invention in a fuel injection valve for internal combustion engines, in longitudinal section;

FIG. 2, a schematic view of a second exemplary embodiment in a fuel injection valve for internal combustion engines, with a leakage pin drilled hollow; and FIG. 3, a diagram with graphs for a leakage pin, in which a gap pressure and a gap width are plotted along a pin length.

DESCRIPTION OF THE EXEMPLARY EMBODIMENTS

The first exemplary embodiment shown in FIG. 1 illustrates a use of the valve of the invention in a fuel injection valve 1 for internal combustion engines of motor vehicles. The fuel injection valve 1 is embodied here as a common rail injector, and the fuel injection is controlled via the pressure level in a valve control chamber 12, which is connected to a high-pressure supply.

For setting an injection onset, injection duration, and injection quantity via force ratios in the fuel injection valve 1, a multiple-piece valve member 2 is triggered via a piezoelectric unit, embodied as a piezoelectric actuator 3 and disposed on the side of the valve member 2 toward the valve control chamber and the combustion chamber.

The piezoelectric actuator 3 is made up of multiple layers, and on its side toward the valve member 2 it has an actuator head 4 and on its side remote from the valve member it has an actuator foot 5, which is braced on a wall 26. Via a bearing 6, a control piston 7 of the valve member 2 rests on the actuator head 4; the control piston is stepped in its diameter.

The valve member 2 is disposed axially displaceably in a bore 8, embodied as a longitudinal bore, of a valve body 9 and along with the control piston 7 also has an actuating piston 10 that actuates a valve closing member 13; the control piston 7 and the actuating piston 10 have different diameters. The control piston 7 and the actuating piston 10 are coupled to one another by means of a hydraulic step-up means.

The hydraulic step-up means is embodied as a hydraulic chamber 11, which transmits the deflection of the piezoelectric actuator 3. Between the two pistons 7 and 10 defining it, of which the actuating piston 10 is embodied with a smaller diameter and the control piston 7 is embodied with a larger diameter, the hydraulic chamber 11 encloses a common compensation volume.

The hydraulic chamber 11 is fastened in such a way between the control piston 7 and the actuating piston 10 that the actuating piston 10 of the valve member 2 executes a stroke that is lengthened by the step-up ratio of the piston diameter when the larger control piston 7 is moved a certain travel distance by the piezoelectric actuator 3. The valve member 2, control piston 7, actuating piston 10 and piezoelectric actuator 3 are located one after the other on a common axis. The filling of the hydraulic chamber 11 is not further shown in FIG. 1.

Via the compensation volume of the hydraulic chamber 11, tolerances from temperature gradients or different coefficients of thermal expansion of the materials used and possible settling effects can be compensated for, without causing any change in the position of the valve closing member 13 to be triggered.

The spherical valve closing member 13 is provided on the end toward the valve control chamber of the valve member 2. The valve closing member 13 cooperates with valve seats 14, 15 embodied on the valve body 9; a spring 27 is assigned to the lower valve seat 15 and upon relief of the valve control chamber 12 keeps the valve closing member 13 on the upper valve seat 14.

The valve seats 14, 15 are embodied in a valve low-pressure chamber 16 formed by the valve body 9 that communicates with a leak drainage conduit 17 and with a compensation conduit 19 that leads to a valve system pressure chamber 18. The leak drainage conduit 17 has a damping device embodied as a throttle 20. The valve low-pressure chamber 16 furthermore has a communication, formed by the lower valve seat 15, with the valve control chamber 12, which is merely suggested in FIG. 1, and with a filling conduit 21 that discharges into the compensation conduit 19.

A movable valve control piston, not otherwise shown in the drawing, is disposed in the valve control chamber 12. By axial motions of the valve control piston in the valve control chamber 12, an injection nozzle of the fuel injection valve 1 is controlled in a manner known per se. In the usual way, an injection line, which supplies the injection nozzle with fuel, also discharges into the valve control chamber 12. The injection line communicates with a high-pressure storage chamber (common rail) that is common to a plurality of fuel injection valves. In a known manner, the common rail is supplied with fuel at high pressure from a tank by a high-pressure fuel feed pump.

On the side toward the valve low-pressure chamber, the compensation conduit 19 leading to the valve system pressure chamber 18 has a spring-loaded overpressure valve 22, which regulates the system pressure in the valve system pressure chamber 18, and is equipped with a damping device embodied as a throttle 24. The filling conduit 21 communicates with the compensation conduit 19 via a leakage pin 23 that regulates the filling and that is fitted into a bore and makes a predetermined leakage possible. In a simple way, the leakage pin 23 enables the realization of a small flow cross section, but in a departure from this, it is understood that a precision bore can also serve as the filling device.

In a highly advantageous version, it can also be provided that the material of the leakage pin 23 has a coefficient of thermal expansion that is greater than that of the material of the valve body 9, in such a way that with increasing temperature, a viscosity-dictated increase in the volumetric flow bathing the leakage pin 23 is greatly limited; given an optimal choice of material, a virtually constant volumetric flow in the event of temperature changes is attainable.

The valve system pressure chamber 18 adjoins the end of the bore 8 toward the piezoelectric actuator and is defined on one end by the valve body 9 and on the other by a sealing element 25 connected to the control piston 7 of the valve member 2 and to the valve body 9. The sealing element is embodied as a bellowslike diaphragm 25 and prevents the piezoelectric actuator 3 from coming into contact with the fuel contained in the valve system pressure chamber 18. It is understood that in other versions the sealing element can also be embodied as a corrugated tube or the like.

The fuel injection valve 1 of FIG. 1 functions as described below.

In the closed state of the fuel injection valve 1, that is, without current being supplied to the piezoelectric actuator 3, the valve closing member 13 of the valve member 2 is kept in contact with the upper valve seat 17, so that no fuel can flow out of the valve control chamber 12, communicating with the common rail, into the valve low-pressure chamber 16 and then escape through the leak drainage conduit 17.

Since the spring rate of the hydraulic spring, with increasing diameter of the control piston 7 protruding into the hydraulic chamber 11, increases proportionally, the prestressing force of the piezoelectric actuator 3 can be adjusted via the diameter of the control piston 7; the greatest possible piston diameter is advantageous. Values adapted to an individual case can be selected by one skilled in the art.

In the event of a slow actuation, as occurs upon a temperature-dictated change in length of the piezoelectric actuator 3 or other valve components, such as the valve member 2 or the valve body 9, the control piston 7 as the temperature rises penetrates the compensation volume of the hydraulic chamber 11, and upon a drop in temperature shrinks correspondingly back again, without this having any overall effect on the closing and opening position of the valve member 2 and of the fuel injection valve 1.

If an injection is to take place through the fuel injection valve 1, then current is supplied to the piezoelectric actuator 3, causing it to abruptly increase its axial length. Upon this kind of rapid actuation of the piezoelectric actuator 3, the piezoelectric actuator is braced on the wall 26, and as a result the actuating piston 10 together with the valve closing member 7 of the valve member 2 moves from its upper valve seat 14 into a middle position between the two valve seats 14, 15. The control motion of the valve member 2 and the motion of the diaphragm 25 decrease the volume of the valve system pressure chamber 18, and as a result the system pressure in the valve system pressure chamber 18 rises accordingly. This pressure increase cannot be reduced immediately by the overpressure valve 22, since the throttle 24 briefly impounds the system pressure. As a result, a hydraulic counterforce acts upon the diaphragm 25, counter to the control motion of the valve member 2. The control motion is thus damped accordingly, so that the valve closing member 13 is stabilized in the middle position between the two valve seats 14, 15.

After the system pressure has been reduced by the overpressure valve 22, the valve closing member 13 can be moved into its closing position against the lower valve seat 15, and as a result fuel can no longer flow out of the valve control chamber 12 into the valve low-pressure chamber 16. The fuel injection is now ended.

After that, the delivery of current to the piezoelectric actuator 3 is interrupted, causing the valve member to return to the middle position between the two valve seats 14, 15, and a fuel injection takes place. Fuel can get into the valve low-pressure chamber 16 through the lower valve seat. Because of the throttle 20 disposed in the leak drainage conduit 17, the pressure cannot be reduced immediately. The brief pressure increase in the valve low-pressure chamber 16 exerts a hydraulic counterforce, which slows down the control motion of the valve member 2 in such a way that the valve closing member 13 is stabilized in its middle position between the two valve seats 14, 15, and fuel injection is again performed. After the pressure reduction in the valve low-pressure chamber 16 through the leak drainage conduit 17, the valve closing member 13 moves into its closing position at the upper valve seat 14. Thus by means of each triggering (delivery of current or termination of current delivery) of the piezoelectric unit, a fuel injection is made possible.

A second exemplary embodiment of the fuel injection valve 1 is shown in FIG. 2, in which for the sake of simplicity functionally identical components are identified by the same reference numerals as in FIG. 1.

Compared to the version of FIG. 1, the fuel injection valve 1 shown here differs in that the throttle 24, disposed in the compensation conduit 19, is replaced by an at least intermittently drilled-hollow leakage pin 23' for filling the valve system pressure chamber. The leakage pin 23' has a throttling region a and a leakage region b. The bore in which the leakage pin 23' is disposed has an annular groove 28, which communicates with the overpressure valve 22. The throttle 24 in the first exemplary embodiment is replaced here by a gap throttle restriction, so that the mode of operation of the damping device of the fuel injection valve does not change. It is understood that other structural designs of the leakage pin 23' are also possible. Also in the second exemplary embodiment, the throttle 20 disposed in the leak drainage conduit 17 has been omitted.

In terms of the choice of material for the leakage pin 23', it can be provided here as well that this pin has a substantially higher coefficient of thermal expansion than the material of the valve body 9, in order to eliminate a viscosity-dictated increase in the event of increasing temperature.

It is understood that the damping devices, embodied as throttles 20, 24 or as a leakage pin 23', can be used either as alternatives or together with one another in the valve of the invention. When a plurality of damping devices are used together with one another, the operation of the valve can be further stabilized.

FIG. 3 is a diagram with graphs in which a gap width s(x) on one side and a gap pressure p(x) on the other can be seen, plotted along the gap height or pin length x of the leakage pin 23'. The pressure decrease in the gap between the leakage pin 23' and the bore surrounding it takes place in linear fashion, if the bore and the leakage pin 23' fitted into the bore are embodied cylindrically; the maximum pressure is equivalent to an internal pressure p__0 in the leakage pin 23', and a minimum pressure prevails in the gap, at a maximum gap width s__0.

As the middle diagram shows, the internal pressure p__0 in the leakage pin 23', which has been drilled hollow, is constant over the pin length x.

The two together mean that the wall of the leakage pin 23', which has been drilled hollow, is widened, and the leakage becomes less or rises more slowly. This assures that at relatively low common rail pressures, adequate filling of the valve system pressure region is assured, while at high common rail pressures the leakage is limited.

In both versions described, the hydraulic medium for filling the hydraulic chamber 11 is the fuel that is also injected into a combustion chamber of an internal combustion chamber. Given a suitable separation between the fuel delivery and the removal of hydraulic medium emerging in the hydraulic chamber 11 and tracking of leakage losses, it is also possible to use separate oil, such as motor oil, as the hydraulic medium.

What is claimed is:

1. A valve for controlling liquids, having a piezoelectric unit (3) for actuating a valve member (2) that is axially displaceable in a bore (8) of a valve body (9) and that has a hydraulic step-up means (11), embodied as a tolerance compensation element, for compensating for elongation tolerances of the piezoelectric unit (3), and one end of the bore (8) is adjoined by a valve system pressure chamber (18) defined by a sealing element (25), and its other end is adjoined by a valve low-pressure chamber (16), which has a leak drainage conduit (17) and which communicates with the valve system pressure chamber (18) via a compensation conduit (19), which has a pressure limiting device (20, 23') and a filling device (23, 23'), and a valve closing member (13) is assigned to the valve member (2) and cooperates in such a way with at least two valve seats (14, 15), disposed in the valve low-pressure chamber (16), for opening and closing the valve (1) that in a closing position it divides the valve low-pressure chamber (16) from a valve control chamber (12) that is at high pressure and in an intermediate position between the valve seats (14, 15), it fluidically connects the valve low-pressure chamber (16) to the valve control chamber (12), and at least one damping device (20, 23', 24) for damping the control motions of the valve member (2) is provided that briefly generates hydraulic counterforces.

2. The valve of claim 1, characterized in that at least one first damping device (23', 24) is disposed in the compensation conduit (19).

3. The valve of claim 1, characterized in that at least one second damping device (20) is disposed in the leak drainage conduit (17).

4. The valve of claim 1, characterized in that the damping device is a throttle (20, 24).

5. The valve of claim 2, characterized in that the first damping device is a leakage pin (23') with a throttling region (a) and a leakage region (b) for filling the valve system pressure chamber (18).

6. The valve of claim 4, characterized in that the leakage pin (23') is drilled hollow in some portions.

7. The valve of claim 1, characterized in that the pressure limiting device is a spring-loaded overpressure valve (22) for setting the system pressure in the valve system pressure chamber (18).

8. The valve of claim 1, characterized in that the filling device is embodied with a leakage pin (23, 23'), by means of which the valve control chamber (12) can be made to communicate fluidically with the valve system pressure chamber (18).

9. The valve of claim 8, characterized in that the material of the leakage pin (23, 23') has a coefficient of thermal expansion greater in such a way than does the material of the valve body (9) that with increasing temperature, a viscosity-dictated increase in the volumetric flow bathing the leakage pin (23, 23') is at least partly limited.

10. The valve of claim 1, characterized in that the sealing element defining the valve system pressure chamber (18) is embodied as a bellowslike diaphragm (25), which is connected in such a way to the valve member (2) and the valve body (9) that the piezoelectric unit (3) is protected against contact with the liquid to be controlled.

11. The valve of claim 1, characterized by its use as a component of a fuel injection valve for internal combustion chambers, in particular of a common rail injector (1).

* * * * *